(No Model.)
E. A. UEHLING.
PROCESS OF AND APPARATUS FOR ANALYZING GASES.
No. 521,444. Patented June 12, 1894.
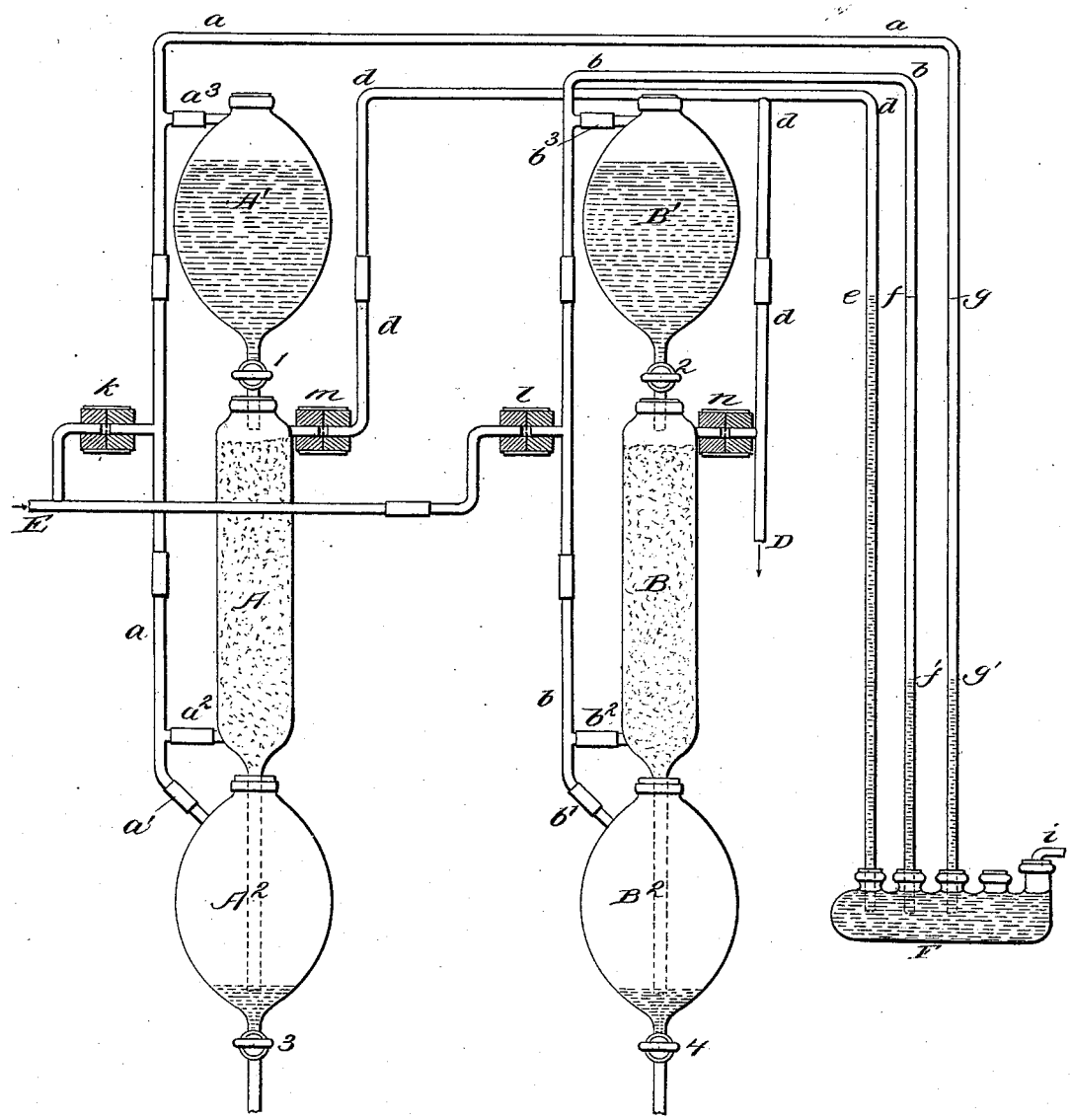

United States Patent Office.

EDWARD A. UEHLING, OF BIRMINGHAM, ALABAMA, ASSIGNOR OF ONE-HALF TO ALFRED STEINBART, OF SAME PLACE.

PROCESS OF AND APPARATUS FOR ANALYZING GASES.

SPECIFICATION forming part of Letters Patent No. 521,444, dated June 12, 1894.

Application filed April 20, 1893. Serial No. 471,142. (No model.)

*To all whom it may concern:*

Be it known that I, EDWARD A. UEHLING, a citizen of the United States, and a resident of Birmingham, in the county of Jefferson and State of Alabama, have invented a certain new and useful Apparatus and Process for the Analysis of Gases, of which the following is a specification.

My invention is directed to means for analyzing or determining the percentages of the different constituents of gases automatically and continuously in such manner that the correct composition of the gas during manufacture is at all times under observation and may be read off as often as necessary or desirable to know the character and quality of the gas. So far as I know and can find the various constituents or elements of gas have never been ascertained and determined automatically and continually during its manufacture.

While my invention is applicable to the analysis of gas from any source where large samples are available, it is primarily intended for determining and making known the quality of gas during its manufacture so that a gas of proper quality may be produced.

The present methods of analyzing gases are very cumbersome and expensive. A sample must be taken in a gas bag, or by its displacement of water in a bottle or jar. The sample must then be taken to the laboratory, where a small portion of it is very carefully measured off in a graduated tube. This carefully measured portion of the gas is then forced into an absorption tube, where by means of a proper chemical one of the constituents is absorbed. It is then returned to the graduated tube where the loss of volume is measured and noted. It is then forced into a second absorption tube and brought in contact with another absorbing chemical which removes a second constituent, after which it is again forced into the measuring tube where the loss is noted as before. This operation must be repeated for each element or constituent of the gas to be determined. From the loss of volume after each manipulation the percentages of the several constituents must then be calculated. It is evident that this method although the best known, is very troublesome, laborious, extended and disconnected, and accurate only in the hands of a skilled manipulator, which renders this method expensive. This method not only requires considerable time in its execution, but is not satisfactory because it can only show what the composition of the gas was at the time the sample was taken. In consequence of these drawbacks and difficulties gas analyses are but rarely made to a sufficient extent to be enabled thereby to control its manufacture even where a knowledge of its composition, especially of more or less temporary variations in the composition of the gas, would be of great importance, as in the manufacture of illuminating gas, and of producer gas used in the smelting of steel and other metallurgical processes.

My invention is designed to overcome all of the above difficulties, expensive operations and disadvantages. It can be applied directly to the gas main from which continuously it will draw a minute portion of the gas, and after setting in operation and adjusting will continuously and automatically indicate the composition of the gas as it is being manufactured, and this in much the same manner as a steam gage shows the boiler pressure, or a thermometer shows the temperature. And therefore, without any manipulation, and without expense except for the absorbing agents, any abnormal condition becomes at once visible, permitting intelligent and speedy correction or change in the character or quality of the gas which is of incalculable advantage both to manufacturers and commerce.

In application my invention is adapted for showing continually the composition of the waste gas of blast furnaces, the knowledge of which is a great aid in anticipating irregularities which, if not corrected may and often do lead to serious difficulties.

In application my invention is adapted for use with chimneys where it will act as a telltale on the fireman showing when too much or too little air is given; whether his fire is too thick or too thin, that is too heavy or too light, meaning that the depth of fuel measured on a perpendicular line from the surface of the grate bars is greater or less than that which would give the most economical results, whereby a great saving in fuel can be effected.

For the accomplishment of the objects and results above stated and for which my invention was designed, it consists of certain novel methods of operation and of certain novel parts and combinations of parts which are embodied in the apparatus illustrated in the drawings. This apparatus, however, I desire it to be distinctly understood, is intended only as an illustration of one form of device embodying my invention, which may be embodied in other and different forms; and in which immaterial departures may be permitted from the general construction and arrangement of parts contributing toward my invention in the device shown. Such device in the accompanying drawings shows a form of apparatus having a construction adapted for carrying out my invention and in which two constituents of a gas may be determined and their percentages continuously indicated, for which purpose the apparatus shows in elevation two absorption vessels or tubes, receiving and outflow reservoirs connected to the opposite ends of said tubes, and their connections, adapted for communication and for the analysis of gases, two constituents whereof, are to be determined.

The principle involved in my invention depends on the law of the flow of gases through a minute opening or aperture, preferably in a very thin plate or diaphragm, by virtue of which any gas being forced through a separated pair of such minute apertures by a constant suction or pressure will have a certain density between the apertures, which will remain constant for a constant quantity of gas passing through both apertures, but will vary, if the quantity of gas be varied between the pair of apertures and it is by these variations that two constituents of a gas may be determined and indicated in the apparatus shown.

The apparatus shown consists in general of one or more absorption tubes and connections, according to the number of constituents to be determined, the inlets of which tubes are connected with the source of gas to be analized and the outlets with a partial vacuum of constant tension; both inlet and outlet are provided with minute apertures.

A, B, are two absorption tubes filled loosely with broken glass or other non-corrodible fragments. With the top and bottom of each of these tubes are hermetically connected respectively the vessels, $A'$, $B'$, and $A^2$, $B^2$. Each of these vessels is at its outlet provided with a stop cock, 1, 2, 3, and 4. The vessels $A'$ and $B'$ are filled with solutions of sufficient capacity for absorbing the constituent of the gas, the percentage of which is to be determined in the absorption tube, with which it is connected. As an example of one suitable solution for the determination of carbonic acid gas, a solution of caustic potash may be used; and for carbonic oxide gas, a hydrochloric acid solution of cupreous chloride; or an ammonia solution may be used, but I prefer the former. By opening the stop cocks 1 and 2, the flow of liquid can be regulated to the quantity required. This liquid percolates through the glass fragments and finds its way into the vessels $A^2$ and $B^2$ after becoming saturated with the gas to be absorbed. The vessels $A'$ and $B'$ are filled and the vessels $A^2$ and $B^2$ are emptied as often as required. These vessels are connected with one another by the tubes $a'$, $a^2$, $m$, $a^3$, $b'$, $b^2$, $b^3$, so that the equilibrium of pressure in them is not disturbed and the liquid can run down freely. The absorption tubes and vessels are connected with the tubes $a$ and $b$, as shown at $a'$, $a^2$, $a^3$, $b'$, $b^2$, $b^3$. The extreme ends of these tubes $a$, $b$, $d$ are immersed in a reservoir F which is filled with a suitable liquid and open to the atmosphere at $i$. Any other form of manometer could be used to indicate the tension, if connected to the tubes and adapted to that purpose. In the connections $k$, $l$, $m$ and $n$, are located the plates with the minute apertures in such manner that the communication can take place through them only.

E is the inlet and D the outlet for the gas to be analyzed.

The apparatus as shown is arranged for operation by suction, which is generally the better way although in some cases pressure may be preferable. Suppose E to be connected with the gas under atmospheric pressure and D with a suction of constant tension, the vessels $A'$, $B'$ filled with solutions of sufficient capacity to absorb the constituents sought, the operation of the apparatus is as follows: If the gas inlet is closed a partial vacuum is at once created in the tube $d$, which will gradually increase to the full tension of the suction at which time all the absorption tubes will have become equally exhausted and the liquid in the tubes $a, b, d$, will have taken the positions $e, f, g$. If we now open the gas inlet, the gas enters through the apertures $k$ and $l$ and the equilibrium is at once disturbed in $a$ and $b$ causing the columns to sink from $g$ to $g'$ and from $f$ to $f'$, which positions indicate the density or degree of vacuum in the different absorption tubes, i. e. between the different minute apertures. If the minute apertures $k$ and $l$, and $m$ and $n$, are adjusted to equal sizes, $g'$ and $f'$ will take the same level. Opening the stop cocks, 1 and 2, the fragments in A and B will become saturated with the absorption liquid, in which the constituent sought will be absorbed, decreasing the quantity of gas between the apertures. If the gas consists wholly of the constituent absorbable, in the tube A, the column $g'$ will will rise to $g$. If the gas is only a fractional part of the gas to be analyzed, the column will take a certain position between $g$ and $g'$, which will rise with the percentage from $g'$ toward $g$. Therefore a scale can be made which will show the percentage of the gas absorbed. The same can be done for the gas absorbable in the tube B, and similarly for any number of tubes which it may be desirable or necessary to connect.

My invention consists of certain novel methods of operation and of certain novel parts and combinations of parts which are embodied in the structure illustrated in the drawing. This structure, however, I desire it to be distinctly understood is intended only as an illustration of one form of device embodying my invention which may be embodied in other and different forms.

In explanation of the continuous and automatic operation of the apparatus, it will be understood that the inlet pipe is connected with the gas main or other source of the gas to be analyzed; and the outlet is connected with a suction apparatus of any approved form set so as to produce and maintain a partial vacuum of constant tension, equivalent for instance to twenty inches of water, more if necessary and less if found sufficient. This suction will cause a stream of gas to flow continuously through the apparatus, or at more or less prolonged intervals if that should be sufficient. But as long as the suction acts, and the gas inlet is open the apparatus will indicate the composition of the gas as stated.

The absorbing liquid is contained in the upper vessel and falls drop by drop as slow or fast as required, regulated by the stop cock, into the absorption tube, where it meets the ascending stream of gas to which it exposes the greatest possible surface as it percolates through the broken glass in its descending course to the lower vessel, and on its way absorbs the constituent to be determined. By virtue of this absorption, the tension in the tube, that is, the tension between the two apertures, is reduced proportionately to the quantity of gas absorbed, and hence the degree of tension shown by the manometer connected with the absorption tube is a measure of the constituent sought, and as the flow is continuous, the indication must also be continuous and as the quantity of absorbable gas rises, so will also the tension vary, and thus become at once visible.

The size of broken glass best suited, should pass through a quarter inch mesh and remain on a sieve of one-eighth inch mesh. The idea is to present the greatest possible surface without measurable resistance to the flow of the gas.

Referring to the expression "inlet and outlet apertures," it is not likely that an opening over one one-hundredth of an inch in diameter will ever be used, although I do not wish to limit myself to any particular size of opening. In connection with these minute openings it is the continuous operation of my method in effecting the flow of the gas by means of a constant suction or pressure not merely for the purpose of absorbing the constituent sought, but to create by virtue of the minute apertures placed on opposite sides of the absorption tube, a difference of tension which is a continuous and exact measure of the percentum of gas absorbed by the chemical in the tube placed between the apertures, that distinguishes my invention from any process which is intermittent and any apparatus the operation of which is based on statics.

In my apparatus it will be understood that any solutions which have the capacity of absorbing gases may be used, and it is not required that such solutions shall be of known capacity.

I claim as my invention—

1. The herein described method of analyzing gases and determining the percentage of a constituent thereof, which consists in continuously passing the gas to be analyzed by means of a constant suction through minute inlet and outlet apertures; second, abstracting the said constituent from the gas during its passage between and through said minute apertures whereby the normal tension of a gas is varied, and using the variation of tension in the changed gas as a measure for determining the percentage of said constituent.

2. The herein described method of analyzing gases and determining the percentage of the different or required constituents thereof, which consists in continuously passing the gas to be analyzed through a connected series of minute inlet and outlet apertures; second, abstracting a particular constituent from the gas during its passage through each connected pair of corresponding minute inlet and outlet apertures, whereby the normal tension of the gas is varied, and using the variation of the tension of the changed gas in its passage between each pair of said corresponding minute inlet and outlets, as a measure to determine the percentage of the required constituents.

3. The herein described method of analyzing and determining the percentages of the constituents of gases, which consists in passing the gas to be analyzed under tension through minute apertures into and through a connected series of tubes and again through minute apertures, second, abstracting a constituent from the gas in its passage through said tubes by absorption, whereby the normal tension is varied, and using the variation of tension in the changed gas for operating a manometer to register the percentage of said constituent.

4. In apparatus for analyzing gases, a tube or chamber for containing an absorbent and having a minute inlet and outlet, and a manometer having communication with the absorption tube to indicate the change of tension of the gas between the said minute inlet and outlet caused by the absorption of the constituent the percentage of which is to be determined, substantially as described.

5. An apparatus for analyzing gases consisting of an absorption tube or chamber having a minute inlet and outlet, a receptacle or reservoir connected with the upper end of the absorption tube for supplying an absorbent to said absorption tube and a manometer having communication with the said absorption tube and reservoir, substantially as described and for the purpose set forth.

6. An apparatus for analyzing a gas consisting of an absorption tube or chamber containing non-corrodible particles, and having receptacles connected with its opposite ends to supply fresh and receive the saturated absorbent, respectively, a manometer having connection with the absorption tube and with the said receptacles, means for passing the gas through the absorption tube under tension, diaphragm plates having minute apertures which constitute respectively the inlet and the outlet to the absorption tube, and an indicator to register the tension of the gas, substantially as described for the purpose specified.

7. An apparatus for analyzing gas consisting of an absorption tube having minute inlet and outlet for the gas, and having receptacles connected with the opposite ends, the upper receptacle containing the absorbent to be supplied to and from the said absorption tube, the lower receptacle to receive the saturated absorbent from the said absorption tube, and a manometer having independent connection with the absorption tubes, and with the said receptacles, substantially as described.

8. An apparatus for analyzing and determining the percentages of the different or any one of the constituents of gases, consisting of a series of absorption tubes or chambers, each having a receptacle at its upper and lower ends, and having apertured plates constituting the inlet and outlet, the upper receptacle containing the absorbent and the lower receptacle receiving the saturated absorbent; means for supplying gas to the absorption tubes under tension, an indicator for registering this tension, a separate manometer for each absorption tube having connection therewith and with the said receptacles, to indicate the change of tension in the gas between the inlet and the outlet due to the absorption of the constituent whose percentage is to be ascertained, substantially as set forth.

9. An apparatus for analyzing gases consisting of a connected series of absorption tubes or chambers, suitable inlets therefor connected with a source of supply of the gas to be analyzed, suitable outlets connected with a partial vacuum of constant tension, both inlets and outlets provided with minute apertures, a manometer connected with the outlets, and a manometer connected with the said absorption tubes between the said inlets and outlets, substantially as described for the purpose specified.

10. In an apparatus for the analysis of gas in which the percentages of any number of constituents are indicated by the difference in tension, an absorption tube or chamber arranged between a minute inlet and outlet through which the gas passes in the way described, and a manometer having communication with the said absorption tube between the said inlet and outlet, substantially as described.

11. An apparatus for the analysis of gas consisting of the absorption tube or chamber A connected with minute inlet and outlet apertures $k$ and $m$, the inlet reservoir A' for the absorbing liquid and the outlet receptacle $A^2$, the pipes $a$, $d$, D, and the reservoir F connecting said pipes for operation in the way described.

12. An apparatus for the analysis of gases which indicates continuously and automatically the variation in the composition of any gas by the change in tension caused by the absorption of the constituent, consisting of a tube or chamber between a minute inlet and outlet, a manometer for indicating the variation of tension having communication with the said tube between the inlet and outlet, in the way described, and a manometer indicating the initial tension of the gas.

13. The apparatus herein described for the analysis of gas consisting of the vessel A having an upper and a lower connecting receptacle A', $A^2$, the pipe $a$ connecting the said receptacles and the lower end of the said vessel A, a minute inlet aperture $k$ connecting the pipe $a$, a like minute aperture $m$ connecting the upper end of said vessel A and the pipe $d$, and the reservoir F connecting the said pipes, for operation in the way described.

In testimony whereof I have hereunto signed this specification in the presence of witnesses.

EDWARD A. UEHLING.

Witnesses:
S. BOYER,
W. A. MAJOR.